US010357960B2

(12) United States Patent
Miller

(10) Patent No.: US 10,357,960 B2
(45) Date of Patent: Jul. 23, 2019

(54) THREE-DIMENSIONAL CURING OF A TWO-DIMENSIONALLY PRINTED OBJECT

(71) Applicant: NIKE, Inc., Beaverton, OR (US)

(72) Inventor: Todd W. Miller, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 237 days.

(21) Appl. No.: 15/287,480

(22) Filed: Oct. 6, 2016

(65) Prior Publication Data

US 2017/0120514 A1 May 4, 2017

Related U.S. Application Data

(60) Provisional application No. 62/248,594, filed on Oct. 30, 2015.

(51) Int. Cl.
*B29C 67/00* (2017.01)
*B33Y 80/00* (2015.01)
(Continued)

(52) U.S. Cl.
CPC .......... *B33Y 80/00* (2014.12); *A43B 23/0245* (2013.01); *A43D 8/22* (2013.01); *A43D 95/14* (2013.01); *B29C 64/106* (2017.08); *B29C 64/386* (2017.08); *B29C 69/02* (2013.01); *B29D 35/126* (2013.01); *B29D 35/146* (2013.01); *B33Y 10/00* (2014.12); *B33Y 50/02* (2014.12); *B29C 64/188* (2017.08);
(Continued)

(58) Field of Classification Search
CPC ... B29C 64/106; B29C 64/188; B29C 64/264; B29C 64/277; B29C 64/282; B29C 64/268; B33Y 10/00; B33Y 30/00; B33Y 50/02; B33Y 80/00
USPC ....................... 264/308, 494; 425/174.4, 375
See application file for complete search history.

(56) References Cited

U.S. PATENT DOCUMENTS

2005/0110853 A1* 5/2005 Gardner .................. B05D 5/00 347/102
2009/0304952 A1 12/2009 Kritchman
(Continued)

FOREIGN PATENT DOCUMENTS

CN 104812555 A 7/2015
JP 2015174272 A 10/2015
(Continued)

OTHER PUBLICATIONS

Office Action dated Aug. 17, 2017, in related Taiwanese Patent Application No. 105133970, filed Oct. 27, 2016, 9 pages (with English translation).

(Continued)

*Primary Examiner* — Joseph S Del Sole
*Assistant Examiner* — Lawrence D. Hohenbrink, Jr.
(74) *Attorney, Agent, or Firm* — Klarquist Sparkman, LLP

(57) ABSTRACT

A printing system is used to selectively print a layer material on a surface that is initially in a planar or two-dimensional shape. After the layer material is printed onto the surface, it is exposed to an amount of radiation from a radiation source and partially cured. Several layer materials may be placed on top of one another and are also partially cured. The flat surface may be reshaped into a nonplanar or three-dimensional shape, and the layer materials are again exposed to an amount of radiation and fully cured.

23 Claims, 12 Drawing Sheets

(51) Int. Cl.

| | |
|---|---|
| ***A43D 95/14*** | (2006.01) |
| ***A43B 23/02*** | (2006.01) |
| ***A43D 8/22*** | (2006.01) |
| ***B29D 35/12*** | (2010.01) |
| ***B29D 35/14*** | (2010.01) |
| ***B33Y 10/00*** | (2015.01) |
| ***B33Y 50/02*** | (2015.01) |
| ***B29C 69/02*** | (2006.01) |
| ***B29C 64/106*** | (2017.01) |
| ***B29C 64/386*** | (2017.01) |
| *B29C 64/277* | (2017.01) |
| *B29C 64/282* | (2017.01) |
| *B29C 64/264* | (2017.01) |
| *B29C 64/188* | (2017.01) |
| *B29C 64/268* | (2017.01) |
| *B29L 31/50* | (2006.01) |

(52) U.S. Cl.
CPC .......... *B29C 64/264* (2017.08); *B29C 64/268* (2017.08); *B29C 64/277* (2017.08); *B29C 64/282* (2017.08); *B29L 2031/505* (2013.01)

(56) References Cited

U.S. PATENT DOCUMENTS

2012/0189852 A1 7/2012 Lee et al.
2013/0019506 A1 1/2013 Shiao
2014/0020192 A1* 1/2014 Jones .................... A43B 13/14 12/146 B
2015/0201705 A1 7/2015 Doremus et al.
2017/0087772 A1* 3/2017 Hakkaku ................ B33Y 30/00

FOREIGN PATENT DOCUMENTS

TW 201233354 A 8/2012
WO WO 2014/160506 A2 10/2014
WO WO 2015/112254 A1 7/2015

OTHER PUBLICATIONS

International Search Report and Written Opinion dated Jan. 11, 2017, issued by the European Patent Office in Patent Cooperation Treaty Application No. PCT/US2016/055919, filed Oct. 7, 2016.

* cited by examiner

THREE-DIMENSIONAL CURING OF A TWO-DIMENSIONALLY PRINTED OBJECT

CROSS-REFERENCE TO RELATED APPLICATIONS

This application claims priority to U.S. Provisional Patent Application 62/248,594, filed Oct. 30, 2015, and titled "Three-Dimensional Curing of a Two-Dimensionally Printed Object", the entirety of which is herein incorporated by reference.

BACKGROUND

The present embodiments relate generally to three-dimensional printing systems and methods.

Three-dimensional printing systems and methods may be associated with various technologies including fused deposition modeling, electron beam freeform fabrication, selective laser sintering as well as other kinds of three-dimensional printing technologies.

Structures formed from three-dimensional printing systems can be used with objects formed by other manufacturing techniques. These include textile materials used in various articles of footwear and/or articles of apparel.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
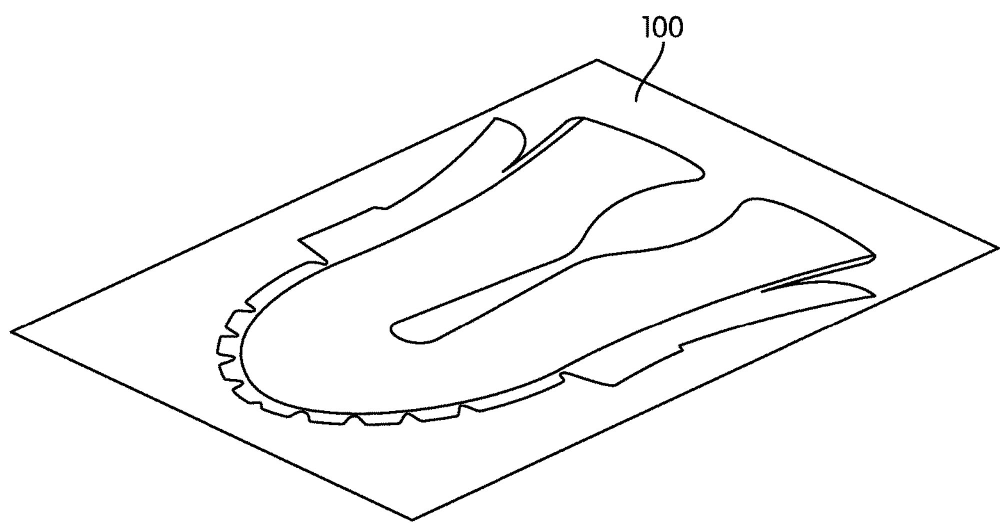
FIG. 1 is a perspective view of an embodiment of a base material element in a planar configuration.

In one aspect, a method of making an article of footwear comprises of positioning a base material element in a planar configuration. Depositing a first layer onto the base material element using a printing device. Partially curing the first layer material during a first radiation event. Depositing a second layer material onto the first layer material using the printing device to form a layer system. Partially curing the second layer material during a second radiation event. Reshaping the base material element into a nonplanar configuration. Fully curing the layer system during a third radiation event.

In another aspect, a method of making an article of footwear comprises of positioning a base material element in a planar configuration. Depositing a first layer material onto the base material element using a printing device. Partially curing the first layer material during a first radiation event. Depositing a second layer material onto the first layer material using the printing device to form a selectively printed design feature. Partially curing the second layer material during a second radiation event. Reshaping the base material element into a nonplanar configuration. Fully curing the layer system during a third radiation event. Wherein the selectively printed design feature includes a first design portion and a second design portion. Wherein the first design portion has a first cross-sectional area. Wherein the second design portion has a second cross-sectional area. Wherein the first cross-sectional area is different from the second cross-sectional area.

In another aspect, a method of making an article of footwear comprises of positioning a base material element in a planar configuration. Depositing a first layer material onto the base material element using a printing device. Determining a first radiation intensity based on at least a first physical property of the first layer material. Partially curing the first layer material by emitting the first radiation intensity during a first radiation event. Depositing a second layer material onto the first layer material using the printing device to form a layer system. Determining a second radiation intensity based on at least a second physical property of the second layer material. Partially curing the second layer material by emitting the second radiation intensity during a second radiation event. Determining a third radiation intensity based on at least a third physical property of the layer system. Reshaping the base material into a nonplanar configuration. Fully curing the layer system by emitting the third amount of radiation intensity during a third radiation event.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

FIG. 1 illustrates perspective view of an embodiment of a base material element for printing. As used throughout this disclosure, base material element or substrate 100 may be associated with articles of clothing or apparel, such as an article of footwear. In this exemplary embodiment, substrate 100 forms an upper for an article of footwear.

In some other embodiments, substrate 100 may be associated with other articles of clothing besides footwear. The term "articles" is intended to include both articles of footwear and articles of apparel. As used throughout this detailed description and in the claims, the terms "article of footwear" and its variants thereof include any footwear and any materials associated with footwear, including an upper, and may also be applied to a variety of athletic footwear types, including baseball shoes, basketball shoes, cross-training shoes, cycling shoes, football shoes, tennis shoes, soccer shoes, and hiking boots, for example. As used throughout this detailed description and in the claims, the terms "article of footwear" and "footwear" also include footwear types that are generally considered to be nonathletic, formal, or decorative, including dress shoes, loafers, sandals, slippers, boat shoes, and work boots.

While the disclosed embodiments are described in the context of footwear, the disclosed embodiments may further be equally applied to any article of clothing, apparel, or equipment. For example, the disclosed embodiments may be applied, but not limited to, hats, caps, shirts, jerseys, jackets, socks, shorts, pants, undergarments, athletic support garments, gloves, wrist/arm bands, sleeves, headbands, bags, any knit material, any woven material, any nonwoven material, and sports equipment such as athletic balls. Thus, as used throughout this detailed description and in the claims, the term "article of apparel" and its variants thereof may refer to any apparel or clothing, including any article of footwear, as well as hats, caps, shirts, jerseys, jackets, socks, shorts, pants, undergarments, athletic support garments, gloves, wrist/arm bands, sleeves, headbands, any knit material, any woven material, any nonwoven material.

Referring to FIG. 1, substrate 100 may have an essentially flat or planar geometry. In some embodiments, this planar geometry allows substrate 100 to be placed onto components of a printing system for printing.

Figure 2:
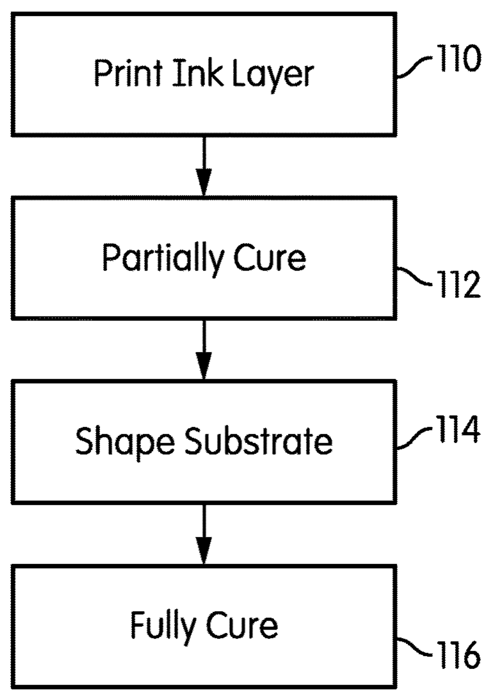
FIG. 2 is an embodiment for a generic process of forming selectively printed three-dimensional design features on a base material element.

Referring to FIG. 2, an embodiment for a generic process for forming three-dimensional objects on a base material element is shown. In some embodiments, the three-dimensional objects have been selectively printed onto a flat substrate, and then the flat substrate is reshaped into a nonplanar object. In some embodiments, some or all of the following steps may be performed by a control unit included within a printing system. In some other embodiments, some or all of these steps may be performed by additional systems or devices associated with a printing system, such as a printing device. In addition, where a printing device is in electronic communication with a computing system, one or more steps could be performed by a central processing device of the computing system. In addition, it will be understood that in other embodiments, one or more of the following steps may be optional, or additional steps may be added.

During step 110, a printing device may print an ink layer, or other layer material, onto a surface of a flat substrate or base material element, or onto a planar portion of an article with a nonplanar shape. In some embodiments, the ink layers will be printed on top of the base material element. In some other embodiments, the ink layers may be printed successively on top of a previous ink layer thereby forming a layer system. In some embodiments, the printed ink layers form design elements onto the substrate.

In some embodiments, after a printhead deposits ink layers onto the base material element, the printing system may utilize provisions to transform the ink layers and form a three-dimensional feature. In other words, the ink layers may be transformed from a liquid state to a semi-solid state or a solid state. In some embodiments, transforming the ink layers will provide structural properties to the ink layers and/or the layer system. In some embodiments, a printing system may use a radiation source to transform or cure the ink layers during a radiation event. As used in this detailed description and in the claims, "cure" and its variants thereof encompasses polymerizing or cross-linking of a polymeric material. Curing may be performed by processes that include, but are not limited to, activating additives by ultraviolet radiation. In one embodiment, a lamp source is used to emit ultraviolet radiation, sometimes referred to as ultraviolet light. In some other embodiment, the radiation source may be different. In still some other embodiments, the ink layers may be transformed using other methods.

In step 112, the ink layers are partially cured by the ultraviolet light during a radiation event. For purposes of discussion, radiation event and its variants thereof may refer to exposing a layer material, such as an ink layer, to radiant energy from any radiation source known in the art. During the radiation event, the radiation source may emit a physical quantity of radiation, such as an intensity of radiation, referred to hereafter as radiation intensity, thereby affecting the physical properties of the layer material. It may be appreciated that there are various measures of light intensity, including radiant intensity (watts per steradian), luminous intensity (lumens per steradian), irradiance (watts per meter squares) and radiance (watts per steradian per meter squared). The appropriate measure of intensity, or radiation intensity, for a given application may be selected by those skilled in the art.

For purposes of characterizing an amount of possible radiation intensities for a radiation source, reference is made to radiation intensities as a percentage of a maximum radiation intensity that can be emitted by a radiation source. Thus, in one embodiment, the possible intensities of radiation may range from 0% radiation intensity (no radiation) to 100% radiation intensity (maximum radiation intensity). In some embodiments, maximum radiation intensity may refer to the maximum radiation intensity achievable by the radiation source, or the maximum desired radiation intensity to achieve a particular curing effect. In one embodiment, maximum radiation intensity refers to the amount of radiation needed to fully cure the layer material.

In some embodiments, curing the ink layers with the ultraviolet light may transform them from a liquid state to a semi-solid state depending on the amount of radiation intensity emitted. In some embodiments, for partial curing, the ink layers may receive less than 50% of maximum radiation intensity needed to transform ink layer from a liquid to a solid state. In one embodiment, the amount of radiation intensity emitted by a radiation source to partially cure the ink layers may range from about 1% to about 50%, typically from about 10% to about 40%. In some embodiments, the ink layers may be partially cured after each layer of ink is deposited by the printhead. In some other embodiments, the ink layers may be partially cured when more than one ink layer has been deposited. It is to be noted that the partial curing of the ink layers occurs while the base material element is in a substantially flat two-dimensional geometric configuration.

In step 114, after the ink layers have been printed onto the substrate and partially cured by the ultraviolet light, the substrate is then reshaped into a nonplanar or three-dimensional configuration. In some embodiments, the substrate is reshaped to conform to a mold. During the reshaping of the substrate, the partially cured ink layers may retain their structural properties and adhere to the surface of the base material without any shear stress or deformation. It is to be noted that during the radiation event, several factors may be considered when determining the amount of radiation intensity for curing. In some embodiments, the amount of curvature (i.e., a 'curvature level') for both the base material element and the layer material may be taken into account to avoid any shear stress or deformation. In some cases, the amount of the thickness of the layer material will also need to be considered. Still in some other embodiments, the flexibility of the layer material needs to be considered during a radiation event. These considerations will be explained further in detail below.

In the final step 116, the substrate, now in a nonplanar configuration, also includes the multiple ink layers also known as a layer system. During this step the layer system is fully cured during another radiation event. During this radiation event, the radiation source may emit an amount of radiation that is more than the amount of radiation used to partially cure the ink layers. In one embodiment, the maximum radiation intensity is emitted by the radiation source thereby fully curing the layer system. Once the base material has been transformed into a nonplanar configuration, and the layer system has been fully cured the result is a three-dimensional nonplanar base material that has a three-dimensional selectively printed design feature devoid of any shear stresses or visible structural deformities.

Figure 3:
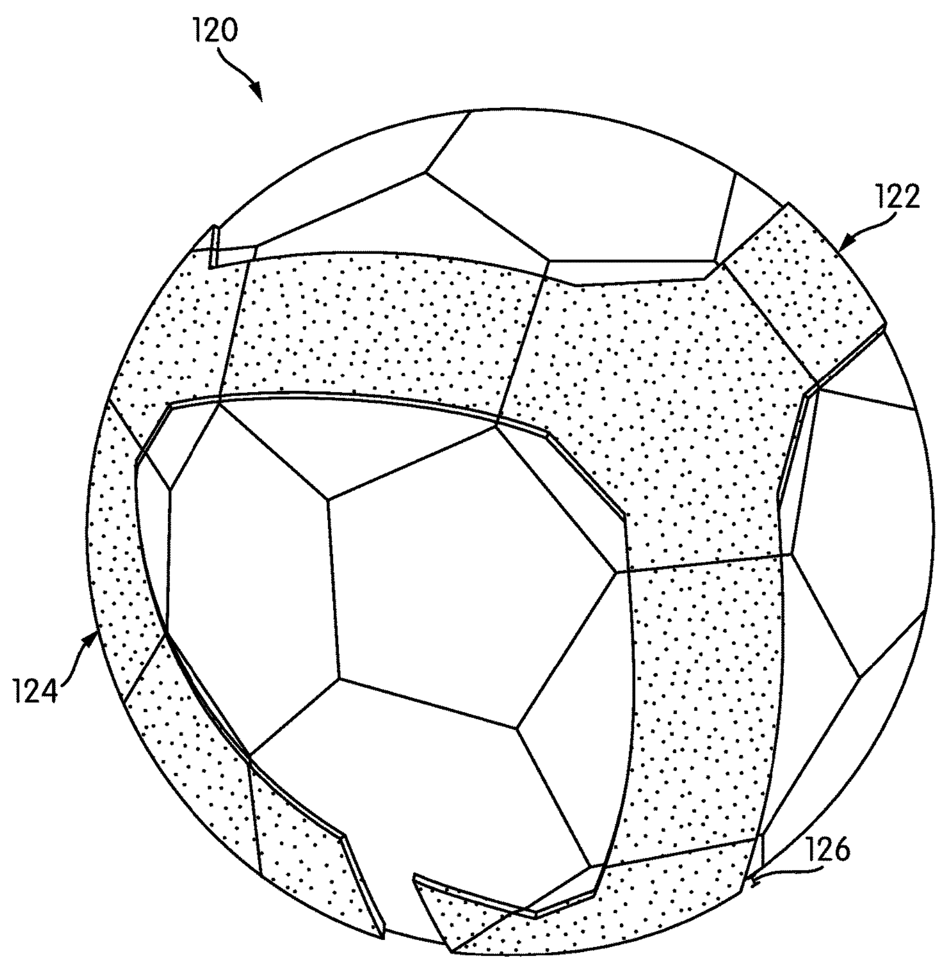
FIGS. 3-4 illustrates a generic embodiment and process that are considered during a radiation event.
Figure 4:
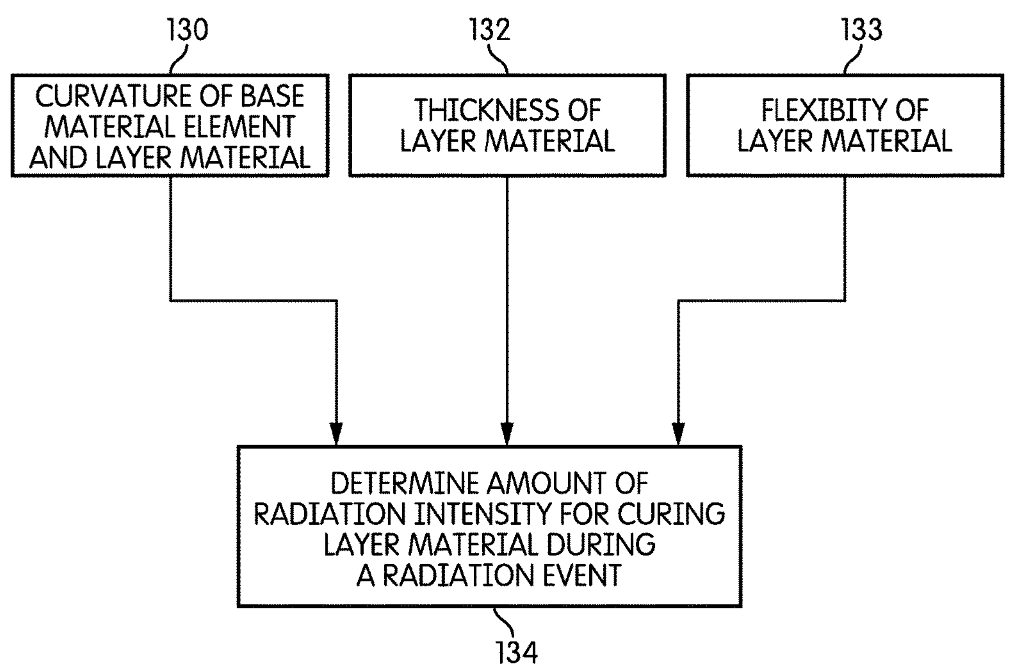

FIGS. 3 and 4 illustrate the concept of what factors may be taken into consideration during a radiation event. FIG. 3 illustrates an embodiment of a non-planar object in the shape of an athletic ball 120. As shown, in some embodiments, athletic ball 120 may have printed layer material 122 disposed above the normal surface curvature of athletic ball 120. In some embodiments, layer material 122 may have been printed and partially cured on athletic ball 120 surfaces while it was in a planar configuration. As noted above, in order to avoid any shear stresses and structural deformities of layer material 122, when athletic ball is transformed into a nonplanar configuration, curvature 124 of layer material 122 and base material element will be considered. In some embodiments, thickness 126, and a flexibility of layer material 122 will also be considered during a radiation event.

In some embodiments, the factors discussed above will be taken into account by those skilled in the art for determining the amount of radiation intensity during a radiation event. Referring to FIG. 4, a first factor 130 comprising the curvature of the base material element and the layer material, a second factor 132 comprising the thickness of the layer material, and a third factor comprising the flexibility of the layer material are used in the a decision process 134. As used herein, the curvature level is a measure of the curvature of a layer or base material element and can include a 'flat' level, which is a level with no or zero curvature. Specifically, process 134 uses these factors to determine an amount of radiation intensity for curing the layer material during a radiation event. Such process may be considered as a sub-process in either of step 112 (partially curing one or more sub-layers) or step 116 (fully curing a layer material), which have been discussed previously and shown in FIG. 2.

Each of these factors (e.g., factor 130, factor 132 and factor 133) may be referred to as 'layer material factors'. These factors generally concern macroscopic properties of a layer material, and may be distinguished from, although related to, microscopic properties such as material composition, physical state (e.g., liquid or solid), viscosity, etc. Moreover, as mentioned above, each factor may vary depending on the step during which they are considered. For example, for partially curing a layer of material on a flat substrate, the curvature of the base material element (i.e., first factor 130) may refer to the curvature that the layer material will take on following partial curing and reshaping of the base material element. Thus, if it is known that a base material element may be highly curved after the layer material is partially cured, the radiation amount should be selected so the layer material is capable of substantial bending (without breaking) following the partial curing. In contrast, when determining radiation for final curing, the curvature of the base material element considered may be the curvature of the element in its current form. Likewise, the thickness of a layer material can be considered in terms of the thickness prior to curing (partial or full) or the desired thickness of the layer material following the next curing event (partial or full). Likewise, the flexibility of the layer material may be considered in terms of either the current flexibility prior to curing (partial or full) or the desired flexibility of the layer material following the next curing event. It may also be seen that the (intended) curvature of the base material element (or the layer material itself) may be related to the (intended) flexibility of the layer material—since higher curvature may require increased flexibility to limit breaking, cracking or non-plastic deformation of the layer material. Thus, in some cases, either the flexibility of the layer material or the curvature of the base material element could be considered as a factor in determining the radiation intensity, rather than considering both.

It may be appreciated that during curing (partial or full), a layer material may undergo a change in physical state or phase. Specifically, curing results in an increase in viscosity of the material, eventually leading to a phase change from a liquid to a semi-solid and finally to a solid. Thus, some factors such as the layer material flexibility are generally different for uncured (liquid), partially cured (semi-solid) and fully cured (solid) states of the layer material.

In some embodiments, if a layer material is not provided with the appropriate amount of radiation intensity, the layer material may experience structural deformities when the base material element is reshaped to a nonplanar configuration. It is to be understood that providing too much radiation intensity during a radiation event may result in the layer material being too hard or brittle to bend. In some other embodiments, an inadequate amount of radiation intensity may result in the layer material not retaining a desired structural shape. It is to be noted that in some embodiments, these factors may be important in determining the type of layer material to place on a base material element. It some embodiments, these factors may be important in determining the location of the layer material on the base material element.

Figure 5:
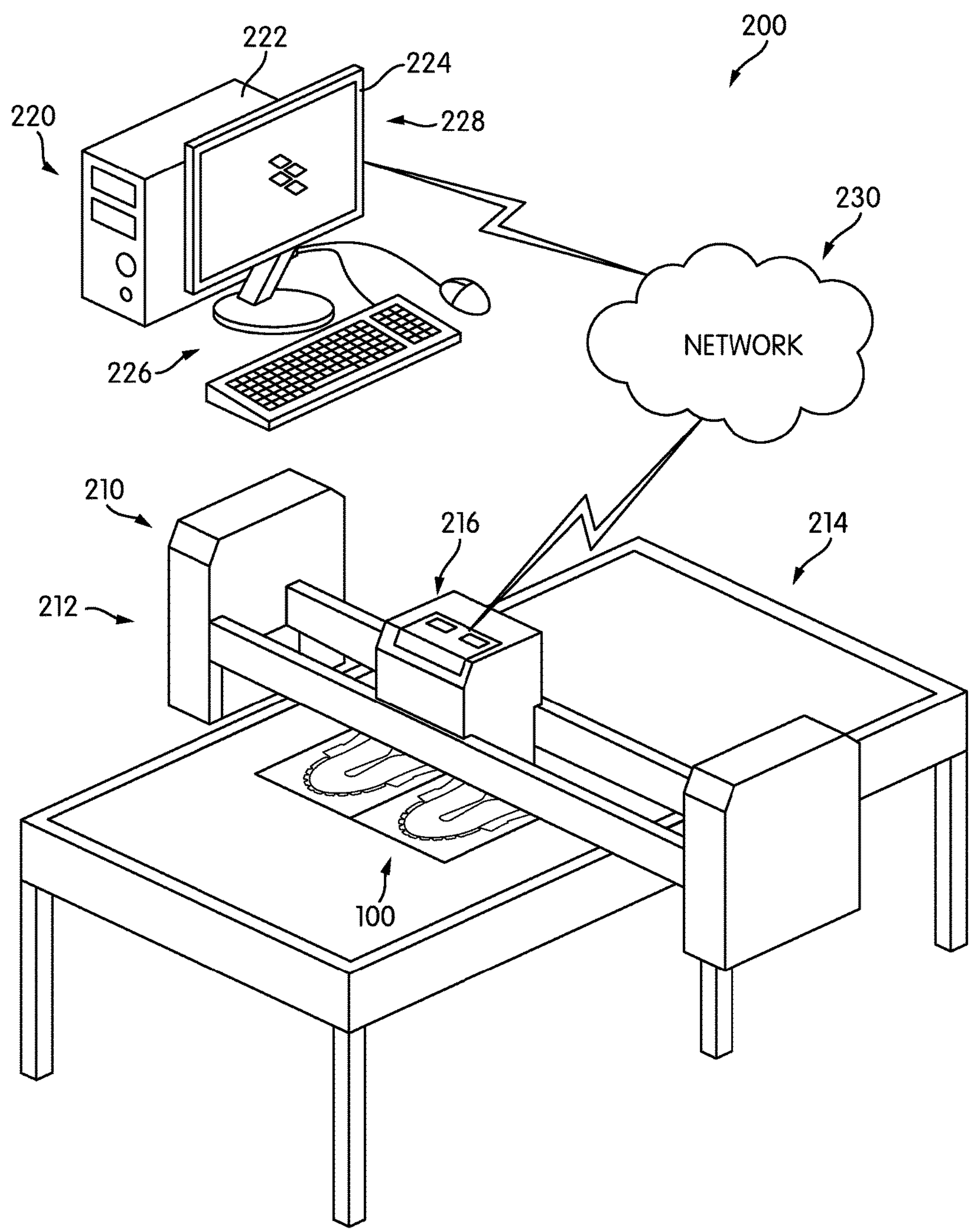
FIG. 5 is a schematic view of an embodiment of components of a printing system with base material elements that may be used with printing system.

FIG. 5 illustrates a schematic view of an exemplary embodiment of components of printing system 200. In some embodiments, printing system 200 may include several components for facilitating the printing of objects, for example, parts, elements, features, or structures on substrate 100. In some embodiments, printing system 200 includes printing device 210, and computing system 220 with network 230. These components will be explained further in detail below. For purposes of illustration, only some components of printing system 200 are depicted in FIG. 5 and described below. It will be understood that in other embodiments, printing system 200 may include additional provisions.

Printing system 200 may utilize various types of printing techniques. These can include, but are not limited to: toner-based printing, liquid inkjet printing, solid ink printing, dye-sublimation printing, inkless printing (including thermal printing and ultraviolet printing), MEMS jet printing technologies as well as any other methods of printing. In some cases, printing system 200 may make use of a combination of two or more different printing techniques. The type of printing technique used may vary according to factors including, but not limited to: material of the target article, size and/or geometry of the target article, desired properties of the printed image, such as durability, color, ink density, as well as printing speed, printing costs and maintenance requirements.

In some embodiments, printing system 200 includes printing device 210. In some embodiments, printing device 210 may include features such as housing component 212, tray 214, and printhead 216. Housing component 212 may be used to support other components, devices or systems of printing system 200. In some embodiments, housing component 212 may include features to move substrate 100 during operation. In some embodiments, the shape and size of housing component 212 may vary according to factors that include the desired foot-print for printing device 210, the size and shape of substrate 100 or multiple substrates, the size and shape of features that may be formed on substrate 100 as well as possibly other factors.

In some embodiments, printing device 210 may include provisions such as a table, platform, tray or similar component to support, retain and/or hold substrate 100. In some embodiments, tray 214 may be used to position substrate 100 while layer materials are being deposited onto substrate 100 by a printhead. In some embodiments, tray 214 may retain a single substrate 100. In some other embodiments, tray 214 may be so dimensioned and sized such that it can retain additional substrates as shown.

Some embodiments may include provisions to facilitate forming a selectively printed design feature on substrate 100. In some embodiments, printing device 210 may include provisions for depositing a layer material onto substrate 100, such as a printhead. As discussed above, in some embodiments, printing device 210 may include provisions for applying radiant energy, such an ultraviolet lamp. In one embodiment, printing device 210 includes a printhead and an ultraviolet lamp to transform a physical property of a layer material and form a selectively printed design feature on substrate 100. These devices will be explained in more detail below.

In some embodiments, printhead 216 may be used to deposit an ink layer in order to form a selectively printed design feature onto substrate 100. As used in this detailed description and in the claims, "selectively printed design feature" and its variants thereof, may refer to depositing a layer material onto portions of a surface at a chosen location on a base material element to define a user selected design, indicia, or marking at that chosen location, and where the finished result is a design, indicia, marking having a three-dimensional structure. Selectively printed design feature may also include both singular and plurality of markings. In some embodiments, printhead 216 is configured to move and deposit an ink layer within housing component 212 in a horizontal direction or axis, for example, front-back and/or left-right with respect to housing component 212.

Some printing systems may include provisions to control and/or receive information from printing device 210. These provisions can include computing system 220 and network 230. As used in this detailed description and in the claims, "computing system" and its variants thereof may refer to the computing resources of a single computer, a portion of computing resources of a single computer, and/or two or more computers in communication with one another. Any of these resources can be operated by one or more human users. In some embodiments, computing system 220 may include one or more servers. In some cases, a print server may be primarily responsible for controlling and/or communicating with printing device 210, while a separate computer, desktop, laptop or tablet, for example, may facilitate interactions with a user (not shown). Computing system 220 can also include one or more storage devices including but not limited to magnetic, optical, magneto-optical, and/or memory, including volatile memory and non-volatile memory.

As illustrated in FIG. 5, computing system 220 may include central processing device 222, visual display component 224, such as a monitor or screen, input devices 226 such as a keyboard and mouse, and software for designing a computer-aided design ("CAD") representation 228 of a design feature. In at least some embodiments, the CAD representation 228 of a design feature may include not only information about the geometry of the structure, but also information related to the materials required to print various portions of the design feature.

In some embodiments, computing system 220 may be in communication with printing device 210 through network 230. Network 230 may include any wired or wireless provisions that facilitate the exchange of information between computing system 220 and printing device 210. In some embodiments, network 230 may further include various components such as network interface controllers, repeaters, hubs, bridges, switches, routers, modems and firewalls. In some cases, network 230 may be a wireless network that facilitates wireless communication between two or more systems, devices and/or components of printing system 200. Examples of wireless networks include, but are not limited to: wireless personal area networks (including, for example, Bluetooth), wireless local area networks (including networks utilizing the IEEE 802.11 WLAN standards), wireless mesh networks, mobile device networks as well as other kinds of wireless networks. In other cases, network 230 could be a wired network including networks whose signals are facilitated by twister pair wires, coaxial cables, and optical fibers. In still other cases, a combination of wired and wireless networks and/or connections could be used.

Figure 6:
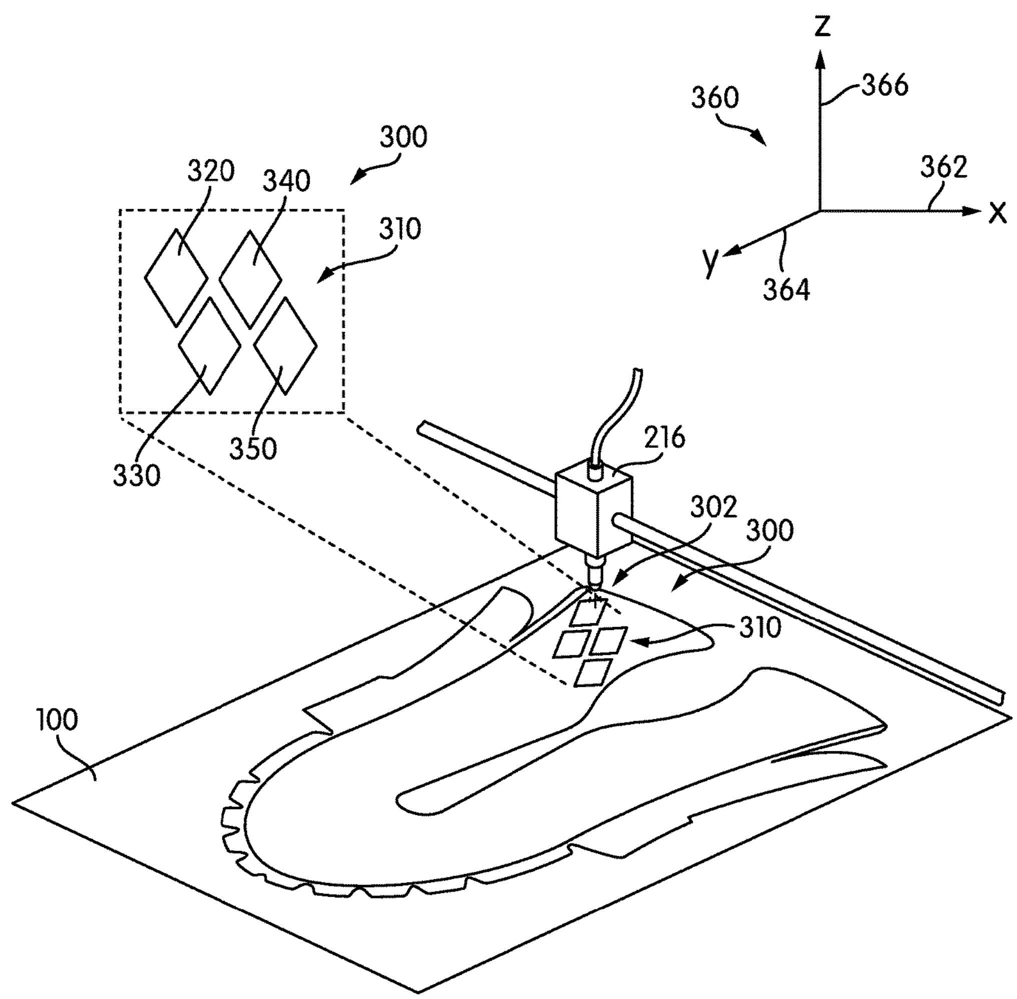
FIG. 6 is a schematic view of an embodiment of a selectively printed design feature being printed onto a base material element.

Referring to FIG. 6, in some embodiments, printing device 210 may deposit layer materials in order to print objects such as a selectively printed design feature 300 directly onto one or more base material elements. In some embodiments, selectively printed design feature 300 may be designed with computing system 220 using some type of CAD software, or other kinds of software, as illustrated in FIG. 5. Selectively printed design feature 300 may then be transformed into information that can be interpreted by printing device 210 (or a related print server in communication with printing device 210). For purposes of illustration, these figures depict some components of printing device 210 isolated from other components. Therefore, the embodiments shown are meant to only be schematic representations of how printing device 210 could print a selectively printed design feature 300 onto a base material element.

In some embodiments, selectively printed design feature 300 may include a variety of forms including, but not limited to: shapes, alpha-numeric characters and/or other types of markings. In some embodiments, selectively printed design feature 300 may have a structural property (i.e. three-dimensional). In some embodiments, the markings may be arranged in a predetermined pattern. In some other embodiments, the markings may be arranged in a random pattern. In still some other embodiments, the marking may be regularly spaced, or have no spaced, or be irregularly spaced from each other. In an exemplary embodiment, selectively printed design feature 300 comprises a plurality of design portions 310.

As seen in FIG. 6, design portions 310 may comprise of first design portion 320, second design portion 330, third design portion 340, and fourth design portion 350. In some embodiments, printhead 216 forms design portions 310 by depositing a layer material such as ink 302 in several layers onto substrate 100 along a horizontal or x-axis 362 and/or y-axis 364 in an x-y-z Cartesian Coordinate System 360. Although design portions 310 are formed in a relatively two-dimensional fashion by printhead 216, in some embodiments depositing ink 302 along x-axis 362 and/or y-axis 364 in multiple layers, results in providing a three-dimensional structural property to each of the design portions 310. In other words, multiple layers by printhead 216 along a horizontal axis, x-axis 362 or y-axis 364, results in the buildup of ink layers along a vertical axis, or z-axis that is normal or perpendicular to the x-axis 362 or y-axis 364.

In some embodiments, as ink 302 contacts the surface of substrate 100, subsequent passes of printhead 216 may deposit additional layers of ink 302 on top of the previous layer. In some other cases, printhead 216 may deposit a layer material on parts of substrate 100 that did not have a previous layer material. In an exemplary embodiment, the deposit of multiple layers of ink 302 on top of each other may be known as a layer system. The deposit of the subsequent additional layers of ink 302 along a z-axis to the previous layer of ink 302, provides selectively printed design feature 300 with three-dimensional structural properties. In some embodiments, ink 302 may be any type of ink that is curable. In one embodiment, ink 302 is an acrylic resin.

Figure 7:
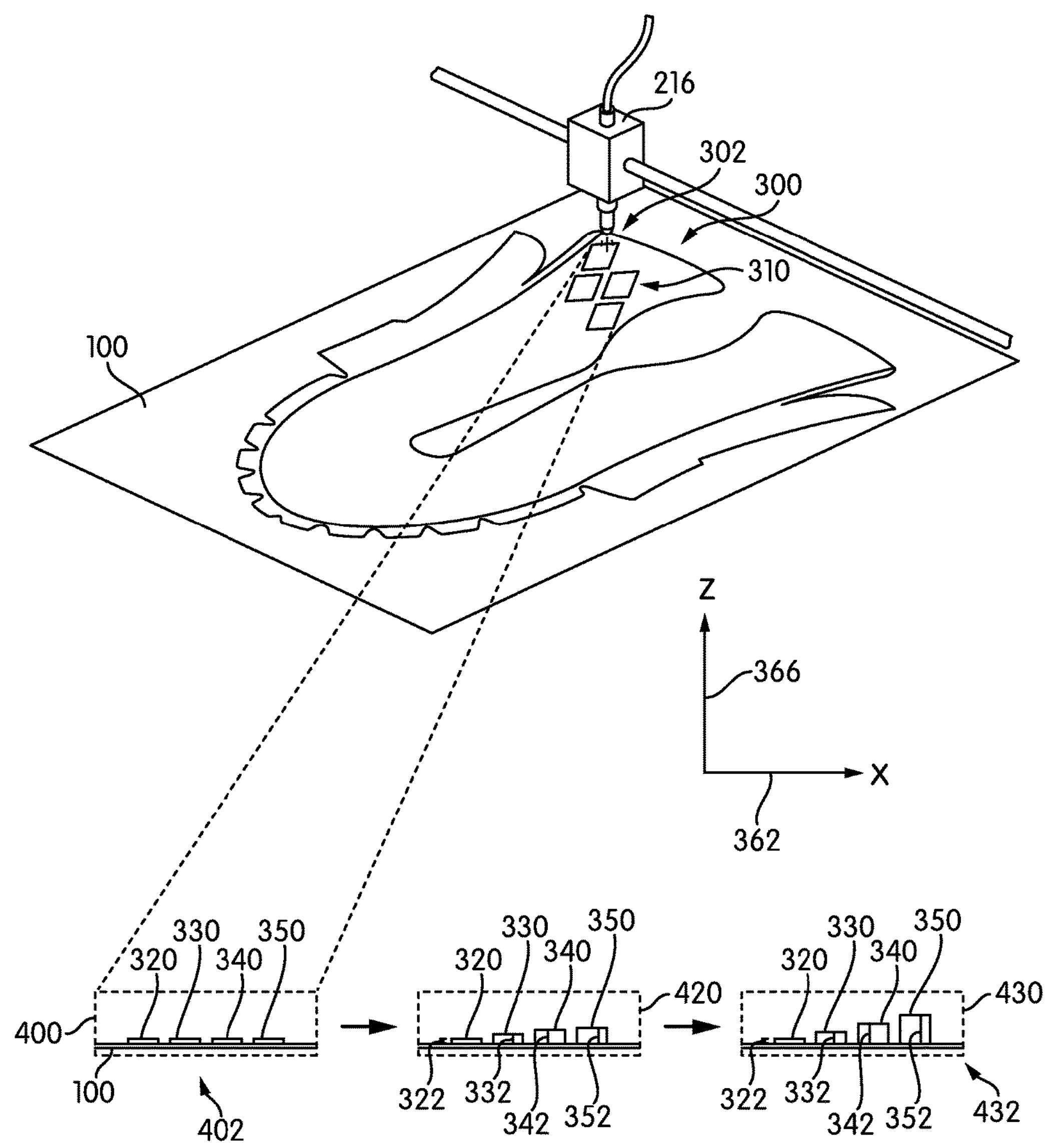
FIGS. 7-8 illustrate a schematic view of steps of forming a selectively printed design feature having a three-dimensional structure printed on a base material element.

Referring to FIG. 7, a schematic view of forming selectively printed design feature 300 having a three-dimensional structure that is printed on a two-dimensional or planar substrate 100 is illustrated. For purposes of illustration, the enlarged views of the following figures depict a sequential representation of successive layers of ink 302 being deposited onto substrate 100 by printhead 216. In particular, the enlarged views depict design portions 310 as they are formed along a vertical axis or z-axis 366.

As shown in FIG. 7, in the first configuration 400, printhead 216 deposits ink 302 onto substrate 100 in a first pass resulting in first layer 402. First layer 402 can be seen having first design portion 320, second design portion 330, third design portion 340, and fourth design portion 350. In some embodiments, each design portion has a height along z-axis 366, and a width along the x-axis. It is also understood that a length along y-axis 364 may also be present. It also understood that the varying height of each design portion results in each design portion having a different cross sectional area.

In the second configuration 420, printhead 216 disperses another layer of ink 302 onto substrate 100. In some embodiments, printing system 200 may configure printing device 210 such that printhead 216 deposits ink 302 in different amounts for individual elements of a design feature. This results in design portions 310 having a structural height formed along z-axis 366. Therefore, after printhead 216 deposits a second layer of ink 302 onto substrate 100, first design portion 320 can be seen having first design portion height 322, second design portion 330 can be seen having second design portion height 332, third design portion 340 can be seen having third design portion height 342, and fourth design portion 350 can be seen having fourth design portion height 352. In some embodiments, first design portion height 322, second design portion height 332, third design portion height 342, and fourth design portion height 352 may all have different values from each other.

Referring to third configuration 430, after a final pass by printhead 216, the resulting layers of ink 302 may be associated with a layer system 432. As illustrated, layer system 432 may include first design portion 320, second design portion 330, third design portion 340, and fourth design portion 350, each having a height along z-axis 366. In particular, first design portion height 322 is seen to be smaller than second design portion height 332 which is seen to be smaller than third design portion height 342 which in turn is smaller than fourth design portion height 352 along z-axis 366. It is to be understood that the number of passes configured by printing system 200 to deposit the layers of ink 302 may vary by those skilled in the art. It is further noted that the number of passes may depend on various factors to include, but not limited to: size, type, color, and structure of the selectively printed design feature, the type of ink used on the substrate, and the type of material used for the substrate.

As discussed above, some embodiments may include provisions to transform the layers of ink deposited onto a substrate. In some embodiments, these provisions may transform the layers of ink deposited onto a substrate from a liquid state to a semi-solid or a solid state. In some embodiments, as printhead 216 deposits the layers of ink 302, a radiation source may be used to treat the layers. In some embodiments, a lamp source is used to emit radiation and cure the layers of ink 302. In an exemplary embodiment, the layers of ink 302 deposited onto substrate 100 to form selectively printed design feature 300 are treated with an ultraviolet light source. Ultraviolet light source may apply an amount of ultraviolet radiation to the layers. As previously mentioned, the emission of radiation intensity occurs during a radiation event. The application of ultraviolet radiation to the layers provides structural properties thus further defining selectively printed design feature 300.

Figure 8:
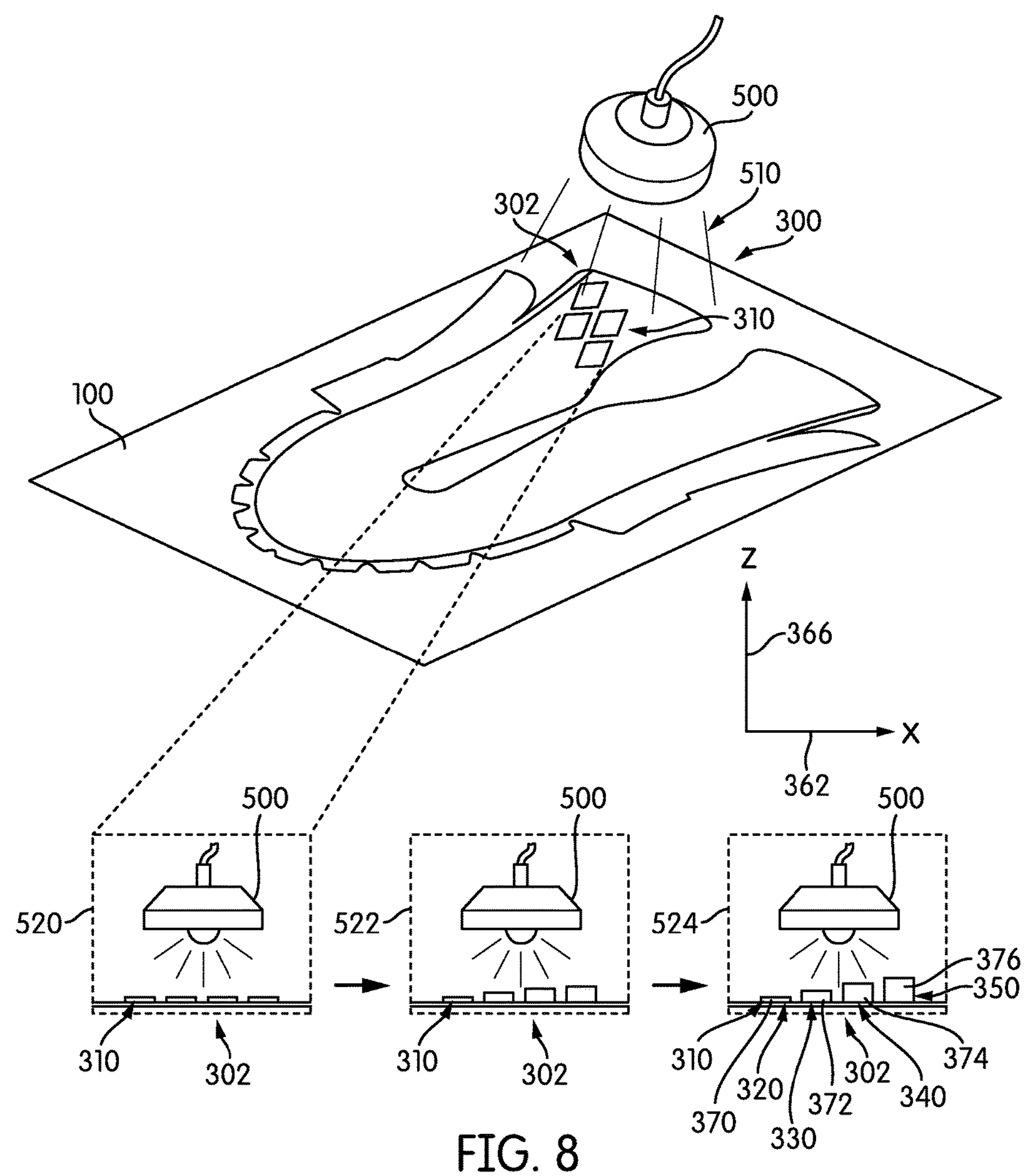

Referring to FIG. 8, ultraviolet light source 500, during several radiation events, can be seen partially curing the design portions 310 which comprise selectively printed design feature 300. For purposes of illustration, ultraviolet light source 500 is depicted in isolation from other components of printing device 210. However it is contemplated that ultraviolet light source 500 may be configured in housing component 212 of printing device 210 by those skilled in the art. In particular, housing component 212 may be configured with ultraviolet light source 500 so that ultraviolet light source 500 may be co-located or proximal to printhead 216. Accordingly, ultraviolet light source 500 may apply an ultraviolet radiation intensity to the layers of ink 302 after printhead 216 deposits the layer material during operation.

For purposes of clarity, the FIGS. 7 and 8 show the deposits of layers of ink 302 by printhead 216 over substrate 100 separately from the radiation events by ultraviolet light source 500. Therefore, in FIG. 8, first radiation event 520 showing partial ultraviolet curing of design portions 310 may correspond with first configuration 400 of FIG. 7. In first radiation event 520, first layer 402 of may be transformed from liquid to a semi-solid state by ultraviolet light source 500. Accordingly, second radiation event 522 may correspond with second configuration 420 of FIG. 7. Further, third radiation event 524 may correspond with third configuration 430 of FIG. 7. In some other embodiments, the radiation events by ultraviolet light source 500 may occur at some other interval.

In some embodiments, after the layer system has been printed by a printhead and partially cured by a radiation source, the design feature may have design portions each with a different cross-sectional area. In some embodiments, the cross-sectional area may vary along the z-axis and x-axis. In some other embodiments, the cross-sectional areas may vary along a different axis. Referring to FIG. 8, in one embodiment, after third radiation event 524, first design portion 320 has first cross-sectional area 370 along the x-axis 362 and z-axis 366. Further, second design portion 330 has second cross-sectional area 372 along the x-axis 362 and z-axis 366. Further, third design portion 330 has third cross-sectional area 374 along the x-axis 362 and z-axis 366. Further, fourth design portion 340 has fourth cross-sectional area 376 along the x-axis 362 and z-axis 366. As shown, first cross-sectional area 370, second cross-sectional area 372, third cross-sectional area 374, and fourth cross-sectional area 376 are different from one another.

Figure 9:
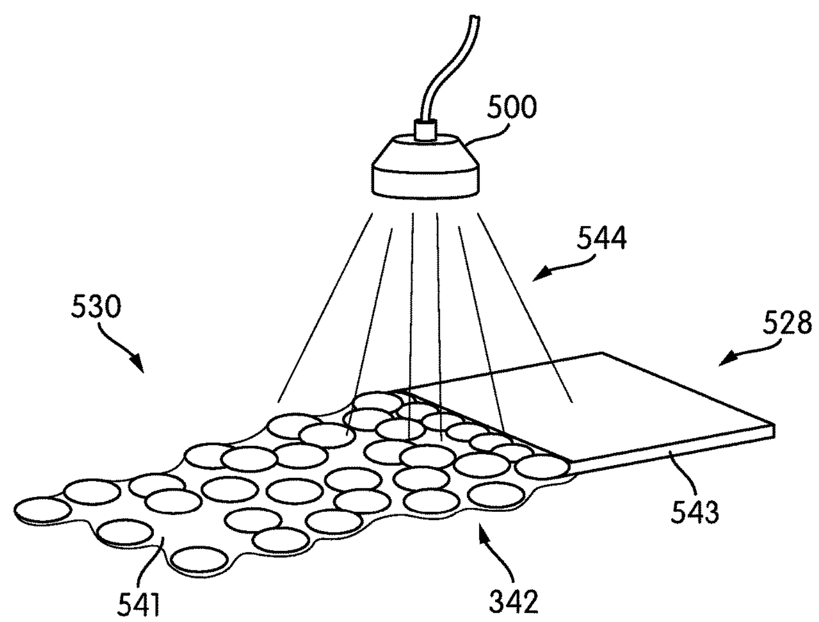
FIG. 9 is an enlarged view of a radiation source transforming a liquid to a semi-solid state.
Figure 10:
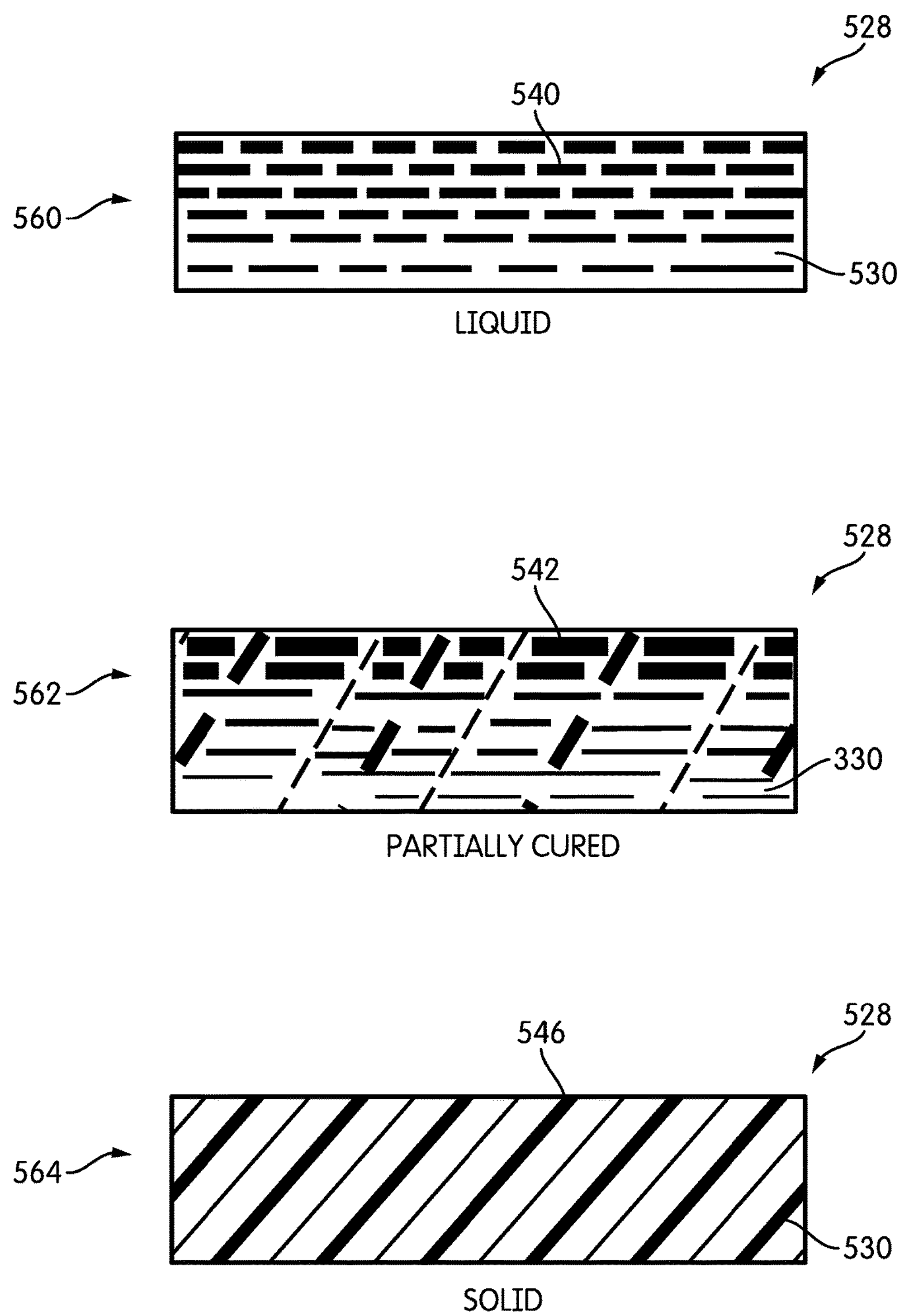
FIG. 10 are cross-sectional views of a layer material in a liquid state, a semi-solid state, and a solid state.

FIGS. 9 and 10 depict an embodiment on the transformation of design portion 528 by ultraviolet light source 500 during radiation events. In some embodiments, as shown in FIG. 9, after layer of ink 530 is deposited, ultraviolet light source 500 may be used to partially cure the layer of ink 530 by emitting radiation intensity 544. Radiation intensity 544 will thus polymerize the layer of ink 530 from a liquid state 541 to a partially cured or semi-solid state 543. Referring to FIG. 10, an enlarged cross-sectional view of layers of ink forming a design portion 528 is shown. In the first configuration 560, design portion 528 is in a liquid state 540. In the second configuration 562, after design portion 528 has been exposed to radiation intensity 544 from ultraviolet light source 500 during a first radiation event, the layers of ink 530 are transformed to a partially cured or semi-solid state 542. In the third configuration 564, an ultraviolet light source 500 may emit a maximum amount of radiation intensity to transform the layers of ink 530 and therefore design portion 528 from a semi-solid state 542 state to a fully cured or solid state 546 during another radiation event.

In some embodiments, after a printing system has finished printing a selectively printed design feature on a planar base material element and after the selectively printed design feature has been partially cured by a radiation source, the base material element may be reshaped into a nonplanar configuration. In some embodiments, the placement of a substrate onto a mold may transform the substrate from a planar shape to a non-planar object.

Figure 11:
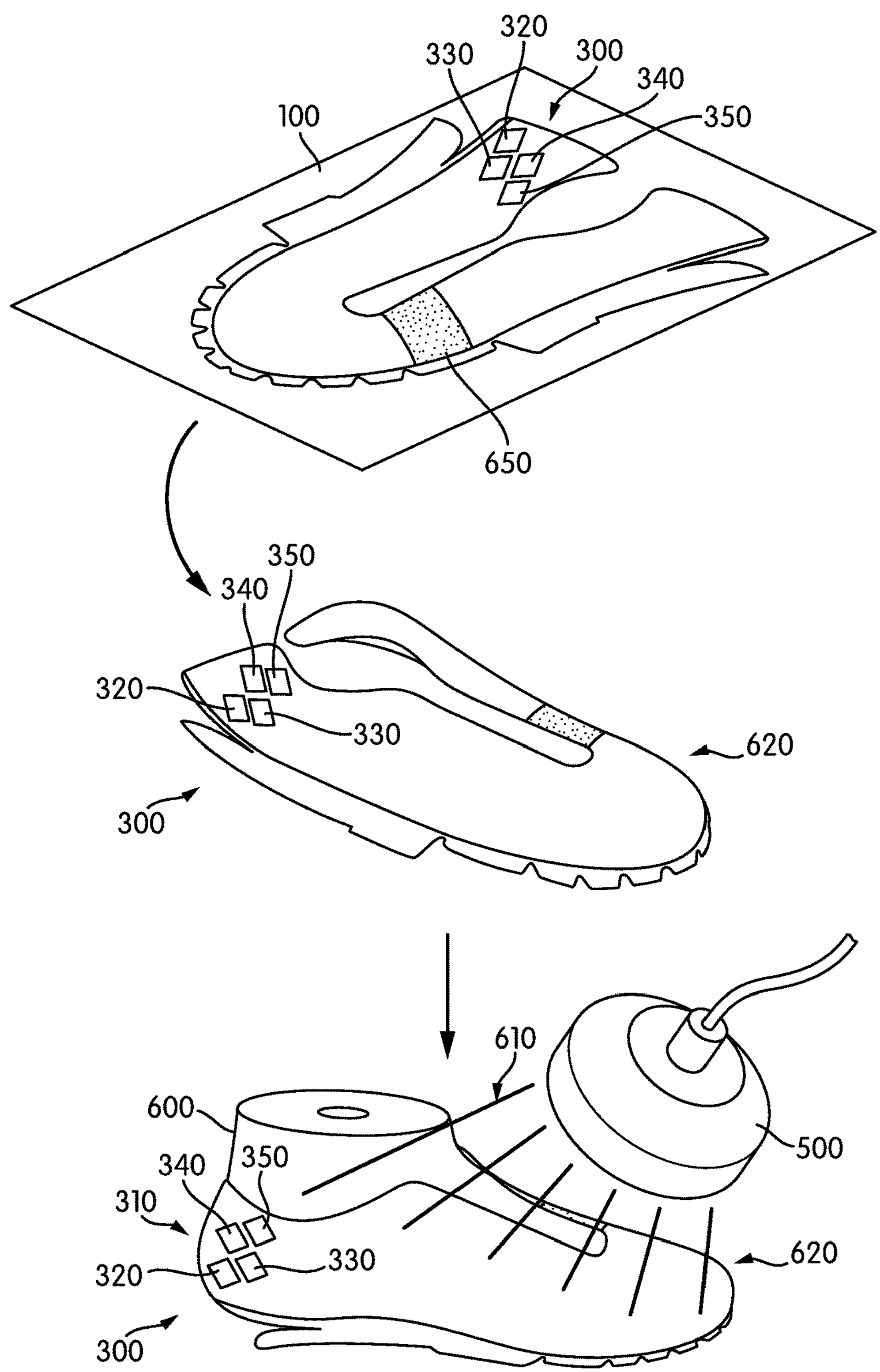
FIG. 11 is a schematic diagram of reshaping a base material, with selectively printed design features, from a planar to a nonplanar configuration.

Referring to FIG. 11, in one embodiment, after selectively printed design feature 300 has been placed on substrate 100 and partially cured by ultraviolet light source 500, it is reshaped into a nonplanar configuration and placed onto a nonplanar mold 600. Design elements 310 of selectively printed design feature 300 will then undergo a full ultraviolet curing by ultraviolet light source 500 during a radiation event. In some embodiments, ultraviolet light source 500 will emit radiation intensity 610 to cure first design portion 320, second design portion 330, third design portion 330 and fourth design portion 340. In some embodiments, the amount of radiation intensity from light source 500 during this radiation event may be greater than the previous amounts of radiation intensity emitted during previous radiation events. The result is an upper 620 for an article of footwear with selectively printed design feature 300 that has design portions 310 with a three-dimensional structure.

In some embodiments, design portions 310 located on upper 620 may have different cross-sectional areas, as shown in the enlarged views and previously discussed for FIGS. 7 and 8. Therefore, after being fully cured by ultraviolet light source 500, first design portion 320 with first cross-sectional area 370, second design portion 330 with second cross-sectional area 372, third design portion 330 with third cross-sectional area 374 and fourth design portion 340 with fourth cross-sectional area 376, will all have different cross-sectional areas from each other, along the x-axis 362 and z-axis 366, as shown in the enlarged views of FIGS. 7 and 8.

In some other embodiments, second selectively printed design feature 650 may also be placed on upper 620. In some embodiment, second selectively printed design feature 650 will be different than design elements 310. In some embodiments, second selectively printed design feature 650 may be printed while substrate is in a planar configuration. In some embodiments, second selectively printed design feature 650 may comprise of several printed layer materials. Still in some other cases, second selectively printed design feature 650, although illustrated as a unitary element, may include different local cross sectional areas along a horizontal and a vertical axis. In one embodiment, second selectively printed design feature is printed simultaneously by printhead 216 during printing of design elements 310. It is understood that second selectively printed design feature 650 may be partially cured by ultraviolet light source 500 after each layer material is placed on substrate. It is further understood that second selectively printed design feature 650 will undergo a full curing by ultraviolet light source as substrate is reshaped into a nonplanar configuration.

Figure 12:
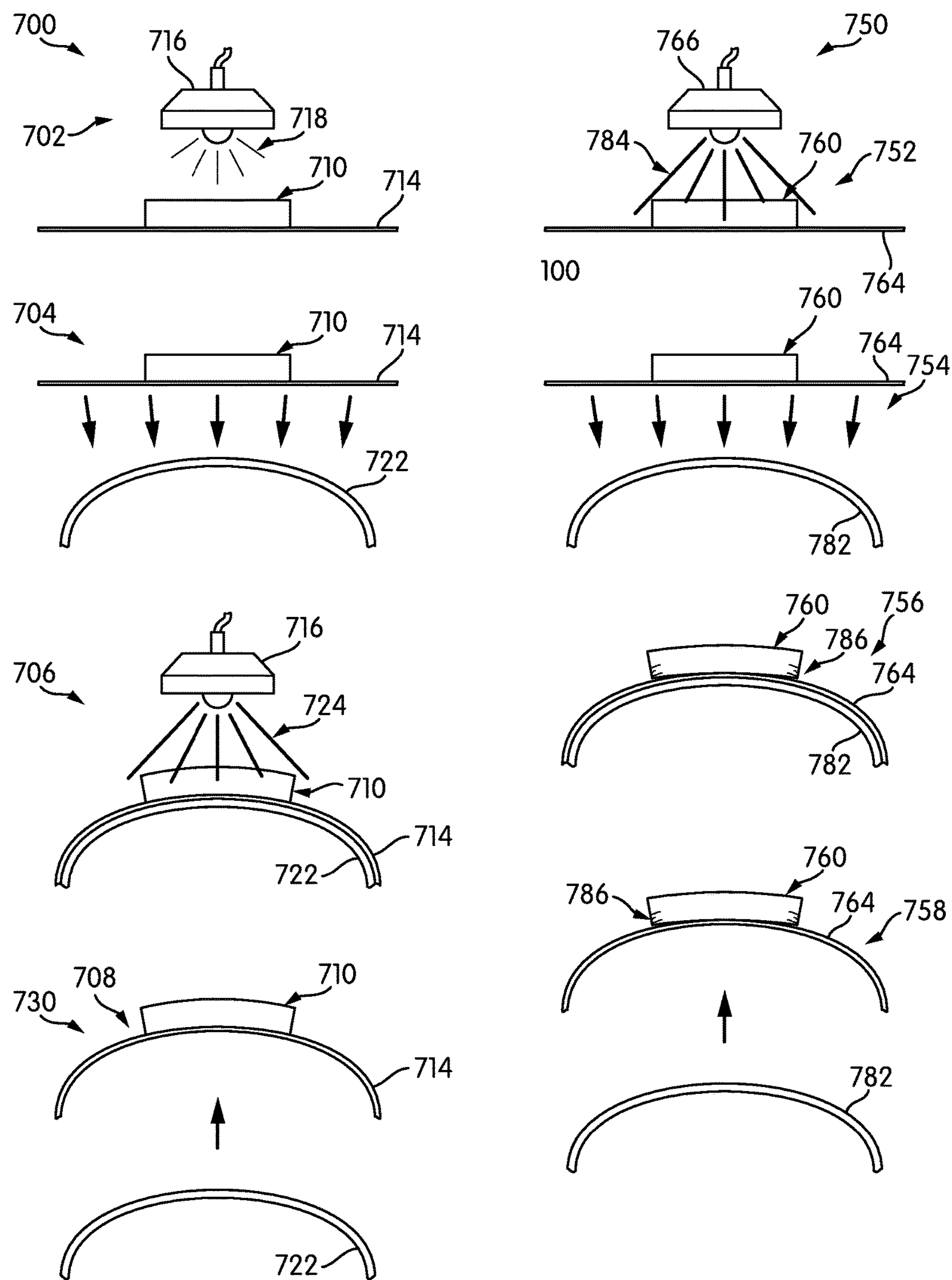
FIG. 12 is a schematic diagram of a comparison between two processes of a base material element having a layer system, where the base material element is reshaped from a planar to a nonplanar configuration.

In some embodiments, this method of partially curing a printed layer material on a planar base material element, and then fully curing the printed layer material after the base material element is reshaped into a nonplanar configuration, improves the structural properties of layer material. In contrast, a method of fully curing a layer material and then transforming the base material element into a nonplanar configuration may result in a three-dimensional structure that contains structural deformities and stresses. Referring to FIG. 12, a side-by-side comparison of an exemplary method 700, and a previous method 750 is illustrated.

In first configuration 702 of exemplary method 700, a layer system 710 has been selectively printed onto a planar base material element 714. In some embodiments, base material element 714 may be associated with an article of clothing. In some embodiments, radiation source 716 will emit a first amount of radiation intensity 718 during a first radiation event and partially cure the layers as they are deposited onto base material element 714. As noted above, the deposit of one layer on top of another layer forms layer system 710. In some embodiments, the partial curing will transform layer system 710 from a liquid state to a semi-solid state. Further, in some cases, the partial curing will also bond the layer system 710 to base material element 714. In second configuration 704, after layer system 710 has been partially cured, base material element 714 is reshaped onto a nonplanar configuration and placed on a mold 722. Subsequently, in third configuration 706, during a subsequent radiation event, radiation source 716 will emit the maximum amount of radiation intensity 724 to fully cure layer system 710 when base material element 714 is in a nonplanar configuration. In some embodiments, radiation intensity 724 by radiation source 716, will change the structural properties of layer system 710 from a semi-solid to a solid state. Further, the full curing will improve the adhesion between layer system 710 to base material element 714. Accordingly, exemplary method 700 results in an absence of shear stress or strain between layer system 710 and base material element 714. As illustrated in fourth configuration 708, after layer system 710 has been fully cured and base material element 714 is removed from mold 722, the resulting article 730 is free of any internal or external deformation and distortion.

In contrast with exemplary method 700, previous method 750, may result in an article with design feature having visible stresses and strain. In first configuration 752 of previous method 750, a design feature comprising layer system 760 has been printed, layer by layer, onto a substrate 764 that is in a planar configuration. However, instead of partially curing layer system 760, previous method 750 will use radiation source 766 to emit a maximum amount of radiation intensity 784 during a radiation event, and fully cure layer system 760. During this radiation event, the maximum amount of radiation intensity 784 will transform layer system 760 from a liquid to a solid state. In second configuration 754, substrate 764 is reshaped from a planar to a nonplanar configuration and placed onto mold 782. In third configuration 756, because layer system 760 is fully cured and therefore in a solid state, during the process of reshaping substrate 764 and placing onto mold 782, shear stresses and structural deformities 786 may develop. In fourth configuration 758, the substrate 764 is removed from mold 782. In this configuration, layer system includes shear stresses and visible structural deformities 786 in contrast to layer system 710 of exemplary method 700.

The embodiments shown in the figures depict UV lamp curing. However, it may be appreciated that in some other embodiments other curing methods could be used. In another embodiment, for example, electron beam curing could be used. In some cases, a robotic arm could be used to move the object relative to an electron beam source for curing (or alternatively, the electron beam source could be mounted on a robotic arm and the object held in place).

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

What is claimed is:

1. A method of making an article of footwear, comprising:

positioning a base material element in a planar configuration;

depositing a first layer material onto the base material element using a printing device;

partially curing the first layer material during a first radiation event, wherein the first radiation event includes a first radiation intensity based on a first layer material factor of the first layer material;

depositing a second layer material onto the first layer material using the printing device, the base material element, the first layer material and the second layer material forming a layer system;

partially curing the second layer material during a second radiation event, wherein the second radiation event includes a second radiation intensity based on a second layer material factor of the second layer material;

reshaping the base material element into a nonplanar configuration; and fully curing the layer system during a third radiation event, wherein the third radiation event includes a third radiation intensity based on a third layer material factor of the layer system.

2. The method according to claim 1, wherein the third radiation intensity is greater than the first radiation intensity and wherein the third radiation intensity is greater than the second radiation intensity.

3. The method according to claim 1, further comprising transforming the first layer material from a liquid state to a semi-solid state during the first radiation event.

4. The method according to claim 1, further comprising transforming the second layer material from a liquid state to a semi-solid state during the second radiation event.

5. The method according to claim 1, further comprising transforming the layer system from a semi-solid state to a solid state during the third radiation event.

6. The method according to claim 1, wherein:

the layer system includes a first design portion and a second design portion;

the first design portion has a first cross-sectional area;

the second design portion has a second cross-sectional area; and the first cross-sectional area is different than the second cross-sectional area.

7. A method of making an article of footwear, comprising:

positioning a base material element in a planar configuration;

depositing a first layer material onto the base material element using a printing device;

partially curing the first layer material during a first radiation event comprising a first radiation intensity based on a first layer material factor of the first layer material;

depositing a second layer material onto the first layer using the printing device, the base material element, the first layer material and the second layer material forming a selectively printed design feature;

partially curing the second layer material during a second radiation event comprising a second radiation intensity based on a second layer material factor of the second layer material;

reshaping the base material element into a nonplanar configuration;

fully curing the selectively printed design feature during a third radiation event comprising a third radiation intensity based on a third layer material factor of the selectively printed design feature;

wherein the selectively printed design feature includes a first design portion and a second design portion;

wherein the first design portion has a first cross-sectional area;

wherein the second design portion has a second cross-sectional area; and wherein the first cross-sectional area is different than the second cross-sectional area.

8. The method according to claim 7, wherein in the third radiation intensity is greater than the first radiation intensity and wherein the third radiation intensity is greater than the second radiation intensity.

9. The method according to claim 7, further comprising transforming the first layer material from a liquid state to a semi-solid state during the first radiation event.

10. The method according to claim 7, further comprising transforming the second layer material from a liquid state to a semi-solid state during the second radiation event.

11. The method according to claim 7, further comprising transforming the selectively printed design feature from a semi-solid state to a solid state during the third radiation event.

12. The method according to claim 7, further comprising using an ultraviolet light source to emit radiation with the first radiation intensity during the first radiation event, to emit radiation with the second radiation intensity during the second radiation event, and to emit radiation with the third radiation intensity during the third radiation event.

13. The method according to claim 7, wherein the first layer material is a first material including an acrylic resin and the second layer material is a second material including an acrylic resin.

14. A method of making an article of footwear, comprising:

positioning a base material element in a planar configuration;

depositing a first layer material onto the base material element using a printing device;

determining a first radiation intensity based on at least a first layer material factor of the first layer material;

partially curing the first layer material by emitting radiation having the first radiation intensity during a first radiation event;

depositing a second layer material onto the first layer material using the printing device, the base material element, the first layer material and the second layer material forming a layer system;

determining a second radiation intensity based on at least a second layer material factor of the second layer material;

partially curing the second layer material by emitting radiation having the second radiation intensity during a second radiation event;

determining a third radiation intensity based on at least a third layer material factor of the layer system;

reshaping the base material element into a nonplanar configuration; and fully curing the layer system by emitting radiation having the third radiation intensity during a third radiation event.

15. The method according to claim 14, wherein the first layer material factor is a thickness of the first layer material, the second layer material factor is a thickness of the second layer material and the third layer material factor is a thickness of the layer system.

16. The method according to claim 14, wherein the first layer material factor is a curvature level of the first layer material, the second layer material factor is a curvature level of the second layer material, and the third layer material factor is a curvature level of the layer system.

17. The method according to claim 14, wherein the first layer material factor is a flexibility of the first layer material, the second layer material factor is a flexibility of the second layer material, and the third layer material factor is a flexibility of the third layer material, wherein the flexibilities of the first layer material and the second layer material refer to desired flexibilities of the layer materials after partial curing.

18. The method according to claim 14, wherein partially curing the first layer material further comprises transforming the first layer material from a liquid state to a semi-solid state.

19. The method according to claim 14, wherein partially curing the second layer material further comprises transforming the second layer material from a liquid state to a semi-solid state.

20. The method according to claim 14, wherein fully curing the layer system further comprises transforming the layer system from a semi-solid state to a solid state.

21. The method according to claim 1, wherein the first layer material factor is a thickness of the first layer material, the second layer material factor is a thickness of the second layer material and the third layer material factor is a thickness of the layer system.

22. The method according to claim 1, wherein the first layer material factor is a curvature level of the first layer material, the second layer material factor is a curvature level of the second layer material, and the third layer material factor is a curvature level of the layer system.

23. The method according to claim 1, wherein the first layer material factor is a flexibility of the first layer material, the second layer material factor is a flexibility of the second layer material, and the third layer material factor is a flexibility of the third layer material, wherein the flexibilities of the first layer material and the second layer material refer to desired flexibilities of the layer materials after partial curing.

* * * * *